United States Patent [19]

Erspamer et al.

[11] 3,784,753

[45] Jan. 8, 1974

[54] MULTIPLEXED GAIN CONTROL FOR A SYNCHRO DATA TRANSMISSION SYSTEM

[75] Inventors: James R. Erspamer; George W. Snyder, both of Phoenix, Ariz.

[73] Assignee: Sperry Rand Corporation, Great Neck, N.Y.

[22] Filed: Dec. 26, 1972

[21] Appl. No.: 318,144

[52] U.S. Cl. .......... 179/15 FE

[51] Int. Cl. .......... H04j 7/00

[58] Field of Search .......... 179/15 FE

[56] References Cited

UNITED STATES PATENTS 3,619,511 11/1971 Ishikawa .......... 179/15 FE

*Primary Examiner*—Ralph D. Blakeslee

*Attorney*—Howard P. Terry

[57] ABSTRACT

A synchro data repeater system is provided with a proportional gain control for compensating for undesirable transmitter signal amplitude variations, the system being particularly adapted for application in magnetic compass systems to compensate for changes in the field strength of the horizontal component of the earth's magnetic field, especially in high latitude navigation.

10 Claims, 22 Drawing Figures

PATENTED JAN 8 1974 3,784,753

MULTIPLEXED GAIN CONTROL FOR A SYNCHRO DATA TRANSMISSION SYSTEM

BACKGROUND OF THE INVENTION

1. Field of the Invention

The invention pertains to compensation of undesirable changes in signal amplitude in synchro data repeater systems and more particularly relates to correction of the adverse effects which variations in flux valve compass data repeater systems.

2. Description of the Prior Art

When navigating at high latitudes while utilizing flux valve magnetic compass systems, difficulty is sometimes experienced because of the decreasing strength of the horizontal component of the earth's magnetic field. The flux valve which provides the input to the magnetic compass normally senses only the horizontal component of the earth's field. At high latitudes, the strength of the sensed horizontal component is proportionally lessened, and the compass system experiences decreasing sensitivity, resulting in heading information of diminished accuracy.

Prior art systems have sought to solve the compensation problem of providing an input to the data repeater substantially independent of variations in the strength of the horizontal component of the earth's field by controlling the gains of amplifiers or the effective values of impedances in the separate channels of the data transmitter system in a relatively complex manner generally in inverse relation to the signal strength as measured at the flux valve itself. Such arrangements are described by D.A. Espen in the U.S. Pat. No. 3,548,284 for "Synchro Data Transmission Apparatus Having Discrete Gain Changing to Compensate for Undesirable Signal Gradient Variations," issued Dec. 15, 1970, and by J.R. Erspamer and G.W. Snyder in the U.S. Pat. No. 3,646,537 for an "Automatic Gain Control for an Electromechanical Transducer," issued Feb. 29, 1972, both patents being assigned to the Sperry Rand Corporation. While these concepts have been useful in providing adequate magnetic field compensation in many circumstances, the compensating signals compensate only for variation in the horizontal magnetic field components, and generally do not additionally correct for gain changes due to component variations or due to temperature or voltage drifts or to component aging. Further, the characteristics of the individual gain control elements of the individual channels of the data system may vary without proper corrective relative adjustments and two-cycle transmission errors are induced.

SUMMARY OF THE INVENTION

The present invention provides means for correction of undesirable changes in signal amplitudes in multiple channel synchro data repeater systems partly by the employment of a common multiplexed automatic gain control in a configuration which not only compensates for magnetic field strength changes, but also corrects for the effects of other error sources. The novel time shared again control monitors the data repeater control signals directly at the inputs to the data repeater, rather than merely at the outputs of the flux valve. By monitoring the inputs at the data repeater, and by using the data repeater excitation voltage as a reference, the gain control, being part of a closed feed back loop, compensates for gain changes caused by variations of component parameters and other effects.

DESCRIPTION OF THE PREFERRED EMBODIMENTS

Figure 1:
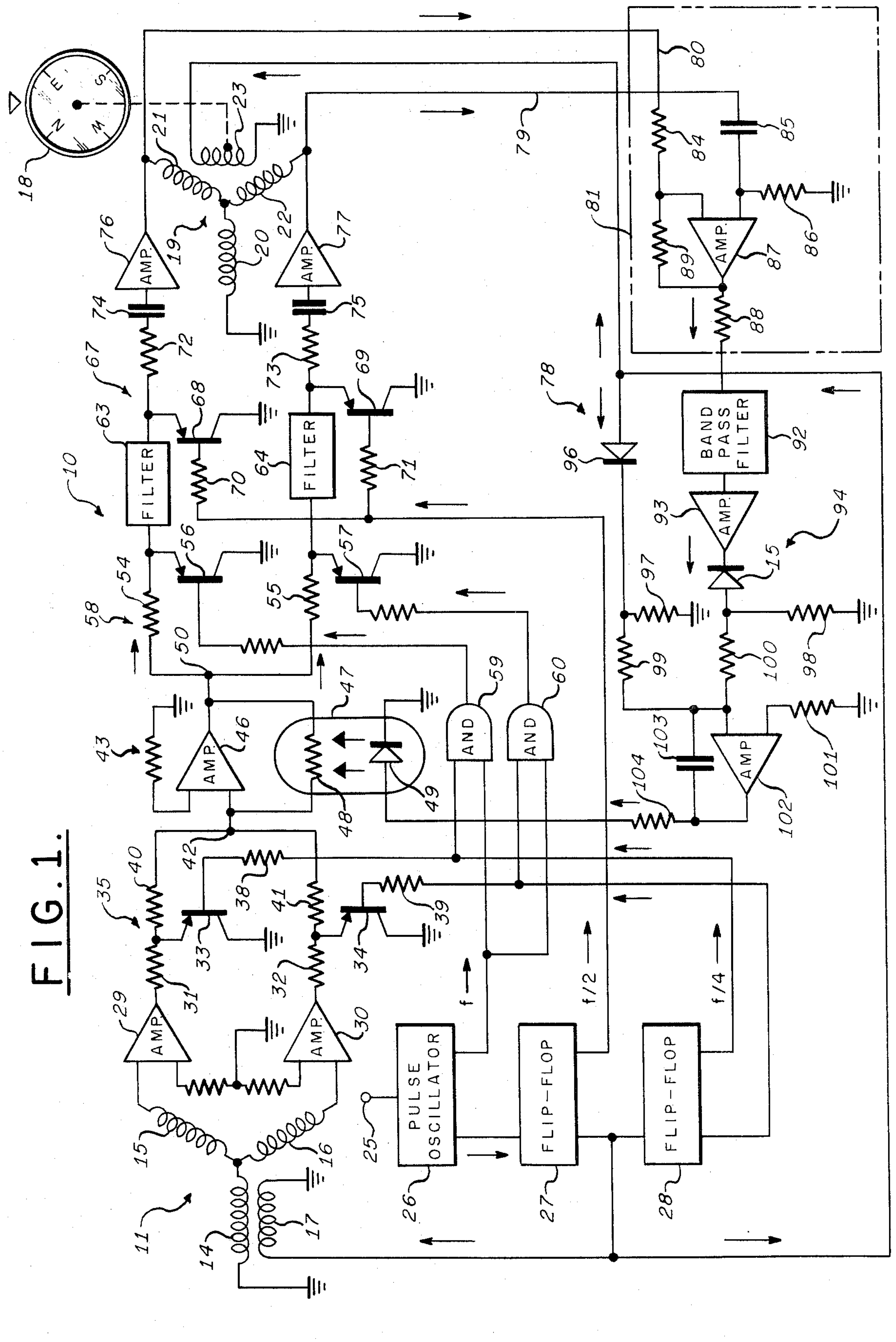
FIG. 1 is a wiring diagram of the invention illustrating its components and their electrical interconnections.

The invention may be employed in a variety of different synchro data transmission systems, but will be discussed by way of example with respect to a flux valve compass and data repeater system 10 as shown in FIG. 1. The magnetic compass system 10 includes a flux valve 11 which is responsive to the horizontal component of the earth's field and which provides periodically varying output signals representative of the actual magnetic heading of the vehicle upon which the flux valve is mounted. Such flux valves and compass systems employing them are generally well known in the art, being illustrated, for example, in the Esval et al U.S. Pat. No. 2,383,461, issued Aug. 28, 1945 for a "Flux Valve Compass System" and assigned to the Sperry Rand Corporation, and elsewhere.

Such flux valves employ magnetic circuits which are generally fixed in position on the wing of an aircraft, for example, the magnetic circuit of the flux valve being subjected to the horizontal component of the earth's field and also being periodically varied in magnetic permeability by currents flowing in a cooperating excitation coil. Periodically varying voltages induced in output windings also coupled to the magnetic circuit provide the desired electrical measure of the direction of the horizontal component of the earth's magnetic field. As seen in FIG. 1, flux valve 11 has three conventional wie-connected pick off or output windings 14, 15, and 16 which are coupled to the conventional flux valve magnetic circuit (not shown), the magnetic circuit also being coupled to the excitation winding 17. The data transmission system 10 has the purpose of positioning a compass card or dial 18 of a conventional synchro data repeater 19 having the usual wie-connected stator coils 20, 21, and 22 and the rotor excitation winding 23.

In synchro data transmission systems, the periodically varying output signals of the signal source 11 or of a transmitter synchro may vary considerably in amplitude. In particular, in flux valve compass systems, the output signals induced in coils 14, 15, and 16 of the flux valve 11 may vary in amplitude over a relatively wide range as a consequence of the fact that the magnitude of the horizontal component of the earth's magnetic field for a given craft altitude is considerably less at high latitudes than at lower latitudes. In the absence of the present invention, the data repeater system 10 would experience undesirable changes in the amplitudes of the flux valve outputs. Reduction of these outputs at high latitudes and other factors may cause corresponding drops in the voltages fed to the coils 20, 21, and 22 of data repeater 19. This event may result in an undesirably low torque being applied to the armature of repeater synchro 19, with consequent lagging of the compass card 18. As even higher latitudes are approached, serious errors in the heading indication of compass card 18 result.

In the present invention, operating power in the form of a square wave is supplied to the respective excitation coils 17 and 23 directly from a conventional frequency dividing flip flop circuit 27 driven by a conventional stable square wave synchronizing oscillator 26 supplied with regulated operating power at terminal 25 from a suitable direct current source (not shown) which may also supply power to other elements of the system as required. Flip flop 27, in turn, drives a second frequency dividing flip flop 28 for supplying square wave pulse trains at yet another frequency for use elsewhere in the system, as will be described. It will be seen with reference to FIG. 1 that synchronizing oscillator 26 produces a square wave signal of frequency *f*, flip flop 27 generates a square wave train of frequency *f*/2. and flip flop 28 produces a square wave train of frequency *f*/4. In practice in a flux valve compass system, the respective waves may have frequencies of 800, 400, and 200 cycles per second.

One winding 14 of flux valve 11 is coupled to ground, while other output windings 15 and 16 are respectively coupled as inputs to paired conventional alternating current amplifiers 29 and 30. Amplifiers 29, 30 serve as conventional pre-amplifiers and may have a voltage gain of the order of ten. They may also be supplied internally with conventional feed back means for providing desired stability.

The sine wave outputs of pre-amplifiers 29, 30 vary relatively in amplitude with craft heading and are coupled by the respective isolating resistors 31 and 32 to a multiplexing or time sharing stage 35 comprising the respective transistors 33 and 34, which may be of the 2N2945 chopper transistor kind. Having grounded collectors, the transistors 33 and 34 have the outputs of amplifiers 29, 30 respectively supplied to their emitter electrodes. The base of transistor 33 is supplied via resistor 38 with one phase of the square wave output of frequency *f*/4 of flip flop 28, while the opposite phase of the *f*/4 frequency square wave from flip-flop 28 is coupled via resistor 39 to the base of transistor 34. As will be seen, the chopper transistor 33 and 34 serve alternately to couple first the output of winding 15 to junction 42 through resistor 40 and then the output of winding 16 to junction 42 through resistor 41 for forming a single multiplexed wave.

The objective of the multiplexing stage including transistors 33, 34 is to time share an automatic gain compensating stage 43 coupled to junction 42. Gain control amplifier stage 43 consists of a conventional operational amplifier 46 coupled between terminals 42 and 50 with a gain control mechanism 47 in its feed back path. Amplifier 46 may demonstrate a voltage gain range of 20 to 200 with a suitable gain control device 47 coupled in operating relation therewith. While other gain control devices may be used, a preferred device constitutes a conventional one in which a conventional photosensitive or photoconductive resistor 48 is coupled in the feed back path of amplifier 46, its resistivity being determined by the amount of light impinging upon it as generated by a light emitting diode 49. Light generation by luminescent diode 49 is controlled in a manner yet to be described but, in general, an increase in the light generated by diode 49 causes a decrease in the resistivity of photoresistor 48, in turn causing the gain of stage 43 to decrease.

The output of gain control compensating circuit 43 is now coupled from terminal 50 through parallel resistors 54 and 55 to the respective emitters of transistors 56 and 57 whose collectors are grounded and which may be of the 2N2945 type. The bases of transistors 56 and 57 are supplied in a novel manner with signals which permit the stage 58 in which they are located to suit a novel purpose; namely, that of simultaneously demultiplexing and demodulating the two input signals in a single simple stage.

For this purpose, one phase of the pulse train of frequency *f* supplied by pulse oscillator 26 is coupled to one input of each of the conventional AND gate 59 and 60. One phase of the frequency *f*/4 output of flip flop 28 is coupled to a second input of AND gate 59, while the opposite phase of the frequency *f*/4 output of flip flop 28 is coupled to a second input of AND gate 60. The complex signal controlling the base of transistor 56 thus simultaneously demultiplexes and demodulates a version of the signal generated in winding 15 of flux valve 11 and supplies it to filter 63. In like manner, the complex signal controlling the base of transistor 57 simultaneously demultiplexes and demodulates a version of the signal originating in winding 16 of flux valve 11 and supplies it to filter 64.

The respective half-wave demodulated signals flowing into filters 63 and 64 are now to be modulated after smoothing by filters 63, 64 at the frequency *f*/2. Filters 63 and 64, having removed undesired signal frequency components such as signal frequencies due to switching transients and low frequency signals caused by normal mechanical oscillations of the flux valve in its pendulous mount, supply respective direct current outputs to the emitters of the conventional modulator transistors 68 and 69, which transistors may also be of the 2N2945 type. The transistors 68, 69 of modulator stage 67 have their collectors grounded and have their bases supplied through the respective resistors 70 and 71 with the square wave train of frequency *f*/2 supplied by flip flop 27. The phase of the square wave thus supplied for operating transistors 68, 69 is opposite to that exciting the excitation coils 17 and 23.

The modulated signal currents output from the modulator stage 67 associated with transistors 68 and 69 flow respectively through resistors 72 and 73, the alternating components thereof being coupled by the respective capacitors 74 and 75 to the conventional power amplifiers 76 and 77. Power amplifiers 76 and 77 may each include in a conventional manner a voltage gain stage and a final or power amplification stage. The power amplified signals of frequency *f*/2 are respectively coupled to data repeater windings 21 and 22, winding 20 being coupled to ground.

The gain compensating stage 43 is controlled by a control voltage generated from the respective signals output by power amplifiers 76 and 77. These *f*/2 frequency signals are coupled via leads 79 and 80 to gain control signal generating circuit 78, whose input stage is a constant-amplitude variable-phase circuit 81 of known type, such a circuit having been described by D.A. Espen in the U.S. Pat. No. 3,617,863 for a "Constant Amplitude Variable Phase Circuit," issued Nov. 2, 1971 and assigned to the Sperry Rand Corporation.

The alternating signal square wave applied to the data repeater winding 21 is coupled by lead 80 through resistor 84 to a first input of amplifier 87, while the alternating signal square wave applied to data repeater winding 22 is fed by lead 79 through condenser 85 and is applied to a second input of amplifier 87. Condenser 85 and the grounded resistor 86 provide a 60° lag in the current supplied to Amplifier 87, which amplifier 87 may be a conventional unity gain operational or buffer amplifier supplied with a stabilizing feed back impedance 89. The voltage that produces current flow through output resistor 88 has an amplitude independent of the position of data repeater dial 18, but an amplitude which contains a measure of any reduction of the horizontal component of the earth's magnetic field at flux valve 11 or of other errors such as may be introduced by non-similarity of the two circuit channels feeding synchro repeater 19 or otherwise arising. The current output resistor 88 is subjected to the conventional band pass filter 92, which passes only signals of frequency $f/2$. These signals of frequency $f/2$ are then applied through a conventional stable buffer amplifier 93 with a nominal voltage gain of 3 or 4 to a comparator circuit 94.

The output of amplifier 93 is rectified by diode 95 and appears as a unipolar voltage across grounded resistor 98 and as a current flowing through isolating resistor 100 into a first input of comparator amplifier 102. As a reference voltage, the frequency $f/2$ square wave signal from flip flop 27 is coupled via diode 96 for providing an opposite polarity unidirectional voltage across the grounded resistor 97 and a corresponding current flowing through isolating resistor 99 again into the same first input of amplifier 102. The second input terminal of amplifier 102 is coupled to ground through resistor 101, amplifier 102 having a high direct current voltage gain of the order of 1,000. As the level of direct current passed by diode 95 varies with respect to that passed by reference signal diode 96, a corresponding unipolar control signal is generated at the output of amplifier 102 for use in gain control device 47.

The stabilized amplifier 102 is provided with a feed back circuit including a capacitor 103 which additionally is adjusted in the factory to control the time constant of the comparator circuit 94 as a whole. It is desired that its time constant be compatible with time constants and other characteristics of filters and other elements of the system so that undesired oscillations are substantially removed. As was observed in the foregoing, the current output of comparator amplifier 102 is coupled through resistor 104 for proportional control of the illumination of diode 49 in the gain control device 47. According to the amplitude of the illumination, the resistivity of photoconductor 48 is proportionally altered so as proportionally to compensate for any change in coupling of the horizontal component of the earth's magnetic field with the flux valve 11. While such earth's field excitation level changes are generally slow, the system also is adapted to correction for absolute loss of gain in the two channels linking flux valve 11 to synchro data repeater 19 due to voltage variations, aging of components, and the like.

In operation, it is seen that the pulse oscillator 26 and flip flop circuits 27 and 28 control the synchronization of the system, since they determine the relative phasal relations of the multiplexer stage 35, the demultiplexer-demodulator stage 58, and the modulator stage 67, as well as the timing of excitation of the exciter coils 17 and 23 respectively associated with flux valve 11 and synchro data repeater 19.

Figure 2:
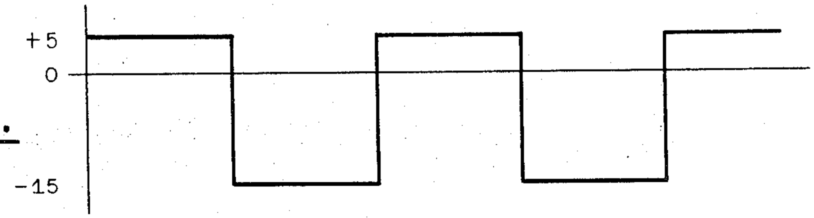
FIGS. 2 through 22 are graphs of wave forms found at various locations in the circuit of FIG. 1 and are useful in explaining operation of the invention.
Figure 3:
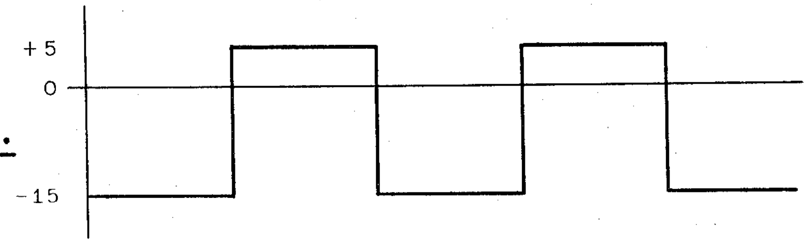

FIGS. 2 through 6 represent the control signals generated for the synchronization of the system (they are represented purely by way of example as ranging between +5 and −15 volts, as other values may evidently be used according to the selected parameters of the circuits). For example, a first phase of the $f/4$ output of flip flop 28, as seen in FIG. 2, is supplied to the base of transistor 33 in multiplexer stage 34 and also as an input to AND circuit 59. In a similar manner, a second or opposite phase of the $f/4$ output of flip flop 28 as seen in FIG. 3 is conducted to the base of transistor 34 in multiplexer stage 35 and also to the input of AND circuit 60.

Figure 4:
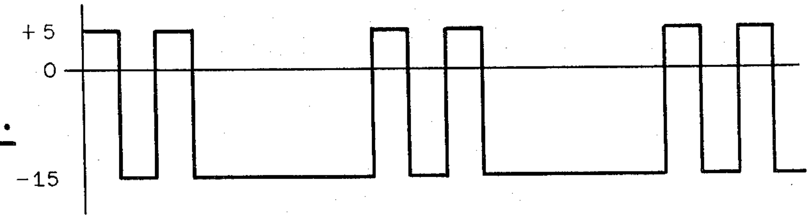
Figure 5:
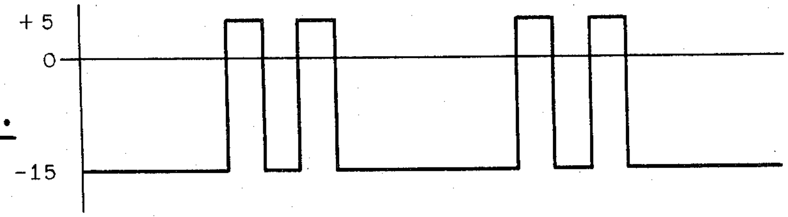
Figure 6:
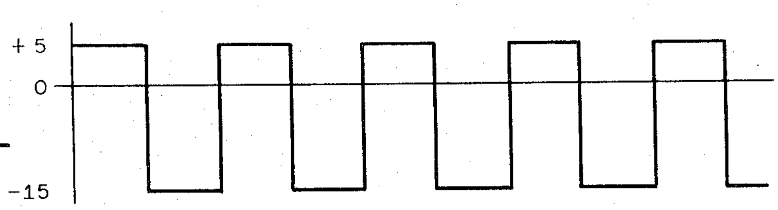

Since AND circuits 59 and 60 are both supplied with the square wave of frequency $f$ generated by oscillator 26, the respective outputs of the AND gates must take the forms shown in FIGS. 4 and 5. The outputs of pre-amplifiers 29 and 30 having been combined for processing by gain control stage 43, they are supplied as a unitary signal to the emitters of transistors 56, 57 of demultiplexer-demodulator 58, which transistors are respectively controlled by the waves of FIGS. 4 and 5. On the other hand, transistors 68 and 69, which form the modulator stage 67, are co-phasally excited by the $f/2$ square wave of FIG. 6.

The frequency of the output pulse train of flip flop 27 supplied to flux valve 11 is $f/2$; because of the known inherent nature of flux valve 11, the consequent outputs of the valve are substantially sine waves of frequency $f$. For a purely arbitrary heading of the craft, the oppositely phased amplitudes of the output signals on legs 15 and 16 of flux valve 11 are respectively shown after amplification in amplifiers 29, 30 in FIGS. 7 and 8. It will be understood that the amplitudes of other of the signals represented in the remaining figures are based upon the same arbitrary, but representative, choice of craft heading.

Figure 7:
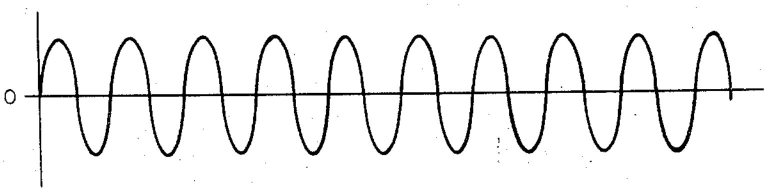
Figure 8:
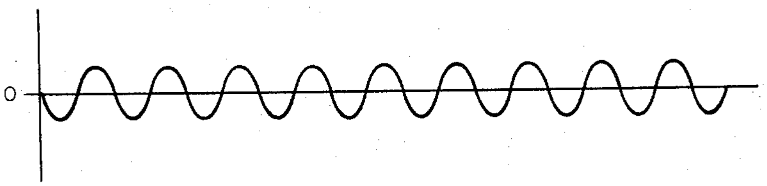
Figure 9:
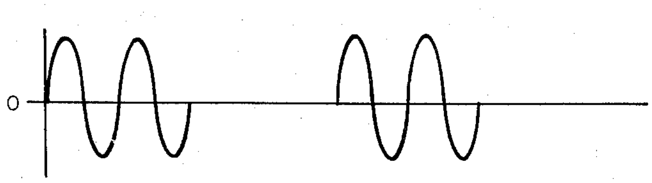
Figure 10:
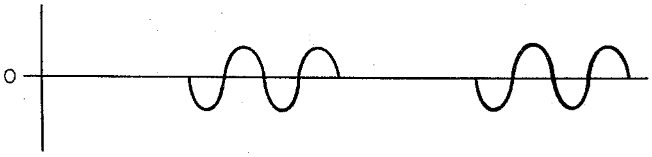

As a consequence, of the operation of multiplexer stage 35 and particularly of transistor 33, the output of pre-amplifier 29 is the chopped or intermittent wave of FIG. 9 having a peaked amplitude substantially the same as that of the sinusoidal wave of FIG. 7. In a corresponding manner, operation of transistor 34 in the multiplexer stage 35 modifies the wave FIG. 8, producing the chopped wave of FIG. 10 whose amplitude peaks have the substantially same magnitude as those of the sinusoidal wave of FIG. 8. Simple direct combination of the chopped waves of FIGS. 9 and 10 at junction 42, since their elements have substantially no overlap in time, produces after amplification by gain control amplifier 46 the composite wave of FIG. 11.

Figure 11:
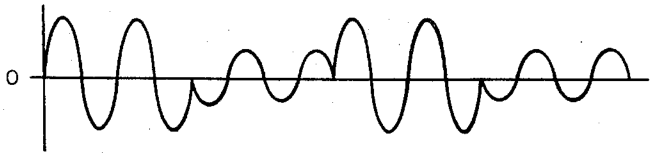
Figure 12:
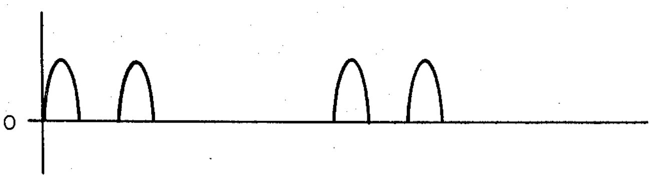
Figure 13:
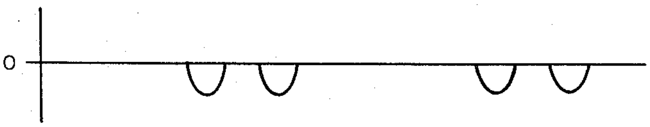
Figure 14:
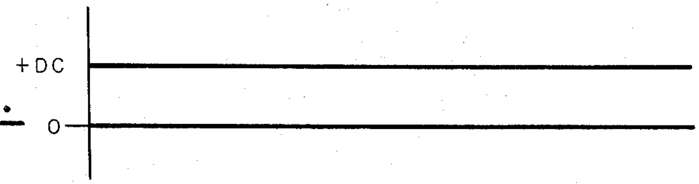
Figure 15:
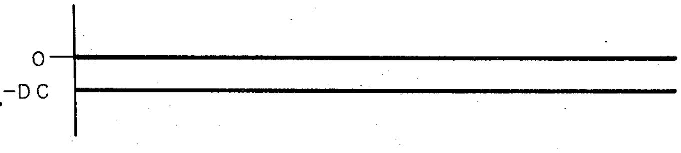

The wave of FIG. 11 is next subjected to manipulation in the novel demultiplexer-demodulator stage 58 by application of the control voltages of FIGS. 4 and 5 to the bases of the respective transistors 56 and 57. The respective consequent output signals, before application to filters 63 and 64, are shown in FIGS. 12 and 13. The peak amplitudes of the intermittent waves of FIGS. 12 and 13 are substantially those of the time-corresponding parts of the composite wave of FIG. 11. After filtering by the filters 63 and 64, the respective direct current signals of FIGS. 14 and 15 are formed; these are respectively direct current signals substantially proportional to the voltage peaks of intermittent waves of FIGS. 12 and 13.

Figure 16:
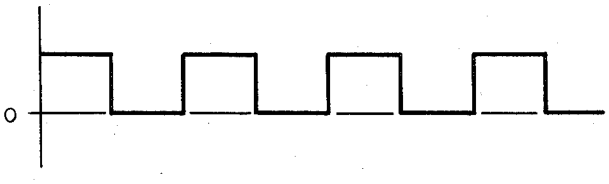
Figure 17:
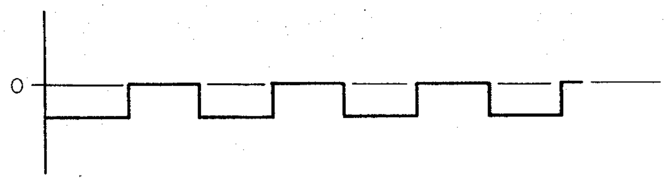
Figure 18:
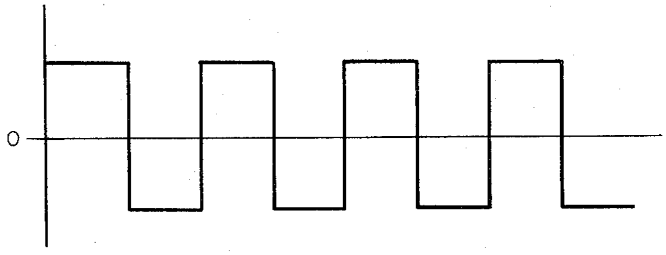
Figure 19:
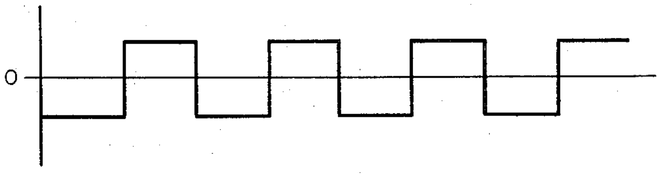

The filtered voltages are now modulated at frequency $f/2$ by the action of the square wave output (FIG. 6) of flip flop 27 in modulator stage 67, forming the respective square wave impulses of FIGS. 16 and 17. The voltage peaks of the wave of FIG. 16 are proportional to the level of the potential of FIG. 14, while the voltage peaks of the wave of FIG. 17 are proportional to the level of the potential of FIG. 15. The potential levels in FIGS. 14 and 15 and, consequently, the peak levels in FIGS. 16 and 17, vary relative to each other as a function of craft heading. Accordingly, there is generated at the output of power amplifier 76 the variable amplitude signal of FIG. 3 whose amplitude is proportional to the amplitude of the wave of FIG. 7 and, at the output of power amplifier 77, the variable amplitude pulse train of FIG. 19 whose amplitude is proportional to the amplitude of the wave of FIG. 8. These signals are substantially unaffected by variations in the power and signal excitation of flux valve 11 and of variations in gain levels in the two channels of the multiplexer, demultiplexer-demodulator, and modulator stages, for example, because of the corrective action of the gain control stage 43.

Figure 20:
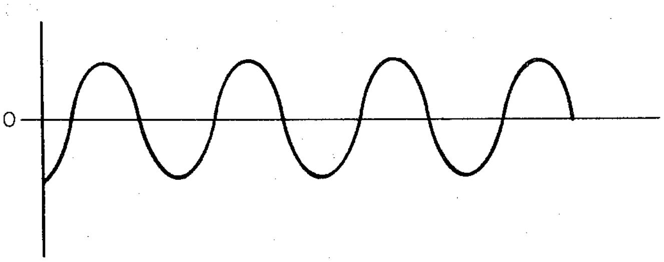
Figure 21:
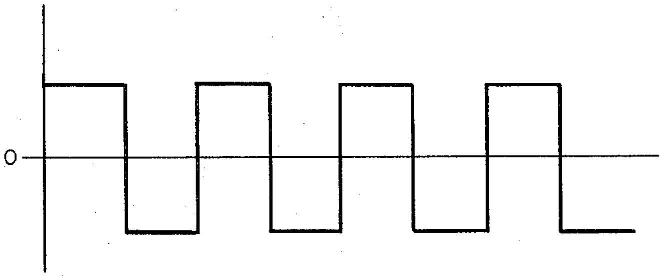
Figure 22:
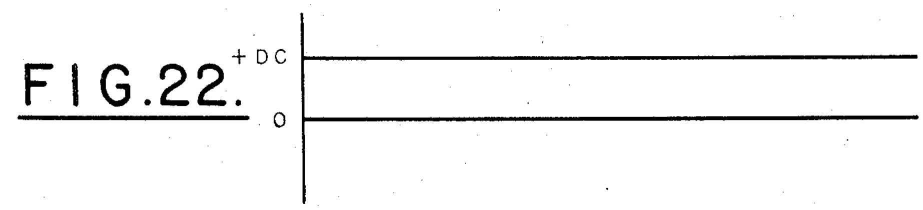

As discussed in the foregoing, the outputs of amplifiers 76 and 77 go to the data repeater 19 and are also supplied to constant amplitude, variable phase circuit 81 and are combined for use in band pass filter 92, thus producing the $f/2$ sine wave signal of FIG. 20, a signal proportional in amplitude to the sum of the voltages at the coils 21,22 of repeater 19. This is a substantially constant amplitude signal due to the operation of gain control stage 43, the phase information in it not being used, since it is converted by rectifier diode 95. The wave of FIG. 21, also supplied to coils 17 and 23, is rectified by diode 96 and the two rectified voltages are compared to form the difference or gain control signal of FIG. 22 at luminescent diode 49 of gain control stage 43.

Accordingly, the invention provides, in a synchro data transmission system such as a flux valve compass data transmission system having a synchro data repeater, means for correction of undesirable changes in signal amplitude in the repeater system, such as changes due to the earth's magnetic field variation with latitude, and additionally compensates for the effects of other error sources in apparatus connected between the flux valve and the synchro data repeater. By monitoring the actual signal which torque the data repeater and by controlling the single gain correcting control circuit by fed back signals, compensation for gain changes due to variation of components is also achieved. The linear gain change effected maintains torque in the repeater per unit craft bearing-displacement substantially constant over a large variation in horizontal magnetic field strength, such as ten to one. With this torquing characteristic held substantially constant, errors in accuracy of the data repeater are largely eliminated and the steady state power consumed by the repeater is reduced. Oscillations of the repeater heading card due to mechanical oscillations of the flux valve are minimized. By placing the common gain control element in its closed loop configuration, it compensates for gain changes associated with circuit component characteristics which change with time, temperature, and the like.

While the invention has been described in its preferred embodiment, it is to be understood that the words which have been used are words of description rather than of limitation and that changes within the purview of the appended claims may be made without departing from the true scope and spirit of the invention in its broader aspects.

We claim:

1. In synchro data transmission apparatus having data transmitter means for providing at least two periodically varying output signals subject to undesirable signal amplitude variations and data repeater means responsive to versions of said periodically varying signals, the improvement comprising:

multiplexer circuit means alternately combining said periodically varying output signals for forming a single multiplexed wave, gain-controlled amplifier means for receiving said single multiplexed wave for time-shared gain control thereof, demultiplexer-demodulator circuit means responsive to said gain-controlled amplifier means simultaneously demultiplexing and demodulating said single multiplexed wave for producing at least two direct current output signals, modulator means responsive to said demultiplexer-demodulator means for supplying said versions of said periodically varying output signals to said data receiver means, and means for combining said versions of said periodically varying output signals for control of the gain of said gain-controlled amplifier means.

2. Apparatus as described in claim 1 further comprising:

synchronizing oscillator means for providing an output signal of a first frequency, frequency divider means responsive to said synchronizing oscillator means for providing an output signal of a second frequency, first and second excitation coil means associated respectively with said data transmitter means and said data repeater means each responsive to said output signal of a second frequency.

3. Apparatus as described in claim 2 additionally comprising frequency divider means responsive to said synchronizing oscillator means for providing an output signal of third frequency.

4. Apparatus as described in claim 3 wherein said multiplexer circuit means includes transistor means responsive to said output signal of a third frequency for alternating coupling a first or a second of said two periodically varying output signals to said gain-controlled amplifier means.

5. Apparatus as described in claim 4 wherein said demultiplexer-demodulator means comprises:

first and second AND circuit means each responsive to said output signal of a first frequency and to said output of a third frequency, first and second transistor means responsive to said first and second respective AND circuit means coupled to said gain controlled amplifier means for simultaneously demultiplexing and demodulating said single multiplexed wave, and filter means responsive to said first and second transistor means.

6. Apparatus as described in claim 5 wherein said modulator means comprises transistor modulator means responsive to said output signal of a second frequency for modulating both of said two direct current output signals at said second frequency.

7. Apparatus as described in claim 6 further including capacitive coupling means and power amplifier means coupled in series relation between said modulator means and said data repeater means.

8. Apparatus as described in claim 7 wherein said means for combining said versions of said periodically varying output signals is responsive to said power amplifier means.

9. Apparatus as described in claim 8 further comprising:

first filter means responsive to said means for combining said versions of said periodically varying output signals, rectifier means responsive to said filter means, comparator means responsive to said rectifier means and to said signal of a second frequency, and second filter means responsive to said comparator means for controlling said gain of said gain-controlled amplifier means.

10. Apparatus as described in claim 9 wherein said gain-controlled amplifier means includes:

photosensitive resistor means coupled in the feed back path of said gain-controlled amplifier, and luminescent diode means for illuminating said photosensitive resistor means in response to said second filter means.

* * * * *